United States Patent
Stark

[15] 3,670,991
[45] June 20, 1972

[54] CARTRIDGE MOUNTING STRUCTURE FOR A CARTRIDGE LOADING MOTION PICTURE PROJECTOR OR THE LIKE

[72] Inventor: Daniel J. Stark, Rochester, N.Y.
[73] Assignee: Eastman Kodak Company, Rochester, N.Y.
[22] Filed: April 23, 1970
[21] Appl. No.: 31,183

[52] U.S. Cl. ............................................ 242/197, 242/197
[51] Int. Cl. .................. G03b 1/04, G11b 15/32, G11b 23/04
[58] Field of Search ........................ 242/197–200, 205–210; 352/72, 73, 78

[56] References Cited

UNITED STATES PATENTS 3,547,373  12/1970  Bundschuh ............................ 242/197
2,135,026  11/1938  Becker ................................... 242/205

*Primary Examiner*—Leonard D. Christian
*Attorney*—Robert W. Hampton and Herman G. Childress

[57] ABSTRACT

A cartridge loading motion picture projector has a spindle that is movable along an arcuate path to each of several positions wherein it is adapted to be engaged with a reel within one of several sizes of cartridges that are mountable on the projector. Each of the cartridge sizes has similar locating structures, the projector spindle is received through openings in the cartridges. The openings and locating structures are positioned with respect to each other so that the openings are located along a second arcuate path if the cartridges are superimposed with their locating structures in alignment. The projector has cartridge mounting structure for positioning each of the similar locating structures on the cartridges at different positions on the projector so that the openings in the cartridges are located along the path of travel on the spindle.

8 Claims, 4 Drawing Figures

DANIEL J. STARK
INVENTOR.

BY *J. Herman Childress*
*R. B. Hampton*
ATTORNEYS

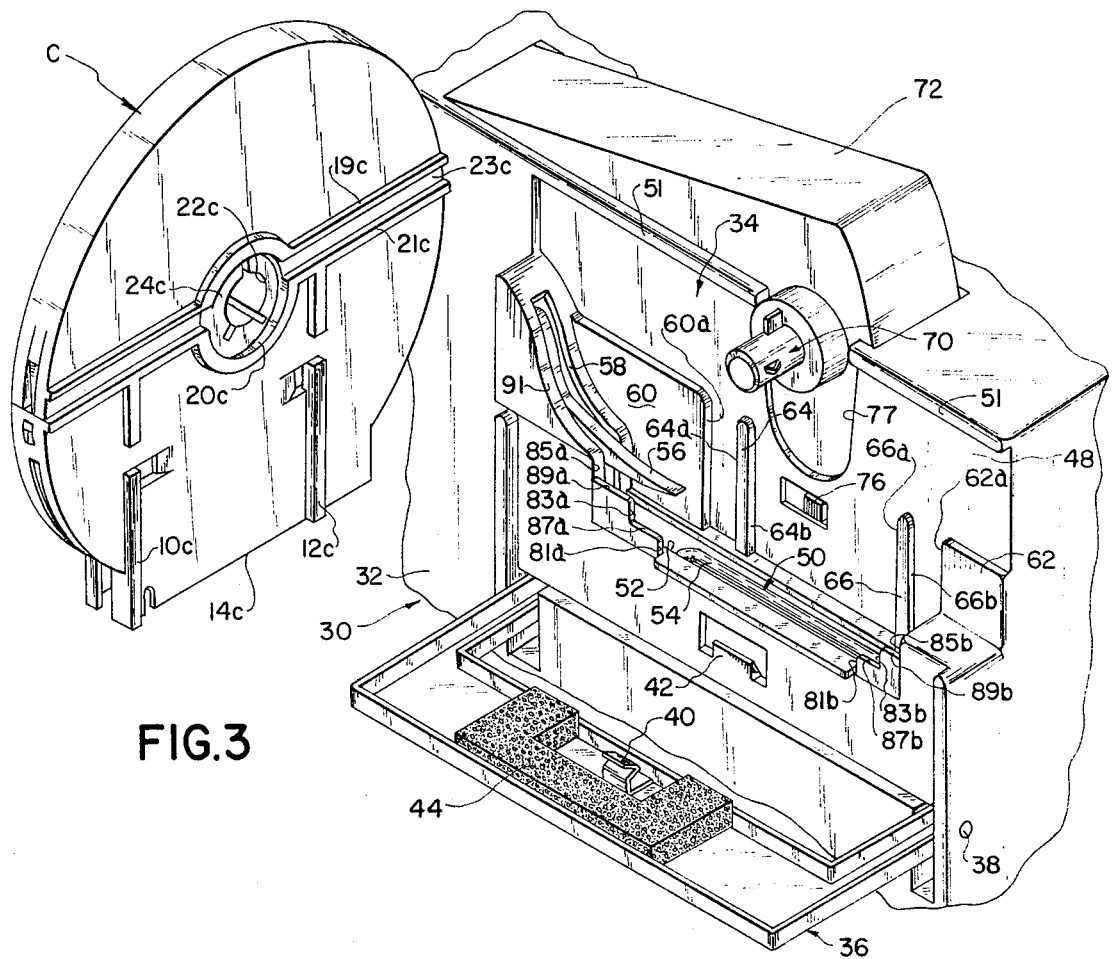
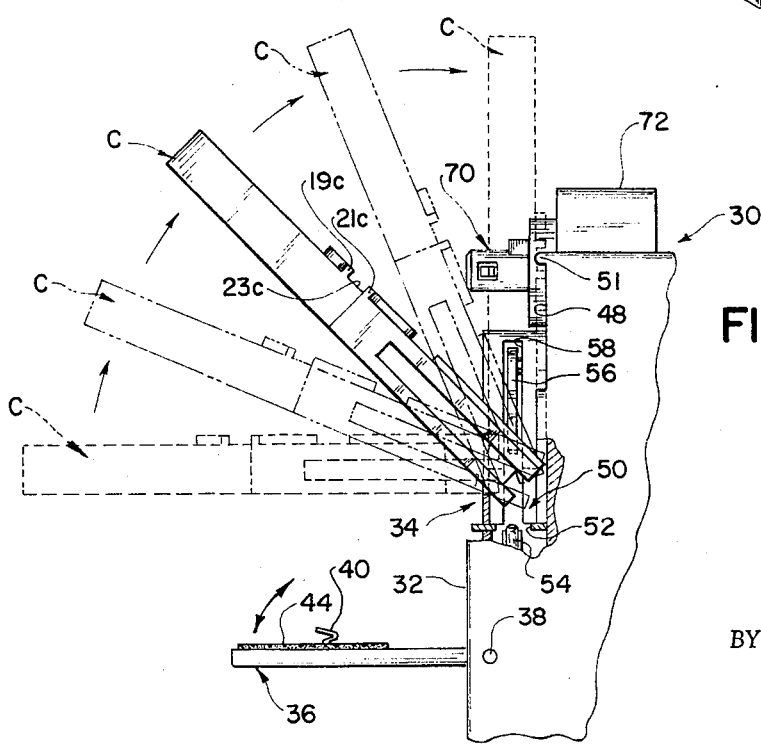

3,670,991

1

CARTRIDGE MOUNTING STRUCTURE FOR A CARTRIDGE LOADING MOTION PICTURE PROJECTOR OR THE LIKE

CROSS-REFERENCE TO RELATED APPLICATIONS

Reference is made to commonly assigned copending U.S. patent applications Ser. No. 685,616, entitled "CINEMATOGRAPHIC PROJECTOR OR THE LIKE AND CARTRIDGES FOR USE THEREWITH," filed in the names of John J. Bundschuh and Robert J. Roman on Nov. 24, 1967, now U.S. Pat. No. 3,552,683; Ser. No. 24,76, entitled "INTERLOCK MECHANISM FOR CARTRIDGE LOADING MOTION PICTURE PROJECTOR OR THE LIKE," filed in the name of Daniel J. Stark on Mar. 31, 1970; Ser. No. 731,561, entitled "CARTRIDGE," filed May 23, 1968 in the name of John J. Bundschuh, now U.S. Pat. No. 3,554,462; Ser. No. 731,562, entitled "CARTRIDGE AND MEANS FOR LOCATING A CARTRIDGE ON A PROJECTOR OR THE LIKE," filed May 23, 1968 in the name of John J. Bundschuh, now U.S. Pat. No. 3,547,373; and Ser. No. 736,524, entitled "CARTRIDGE," filed May 23, 1968 in the name of John J. Bundschuh.

BACKGROUND OF THE INVENTION

1. Field of the Invention

This invention relates to cartridge loading motion picture projectors and, more specifically, to such projectors having a film supply spindle that is adapted to be moved to each of several positions for supporting reels of film within cartridges that are mounted on the projector.

2. Description of the Prior Art

In the beforementioned copending patent application Ser. No. 685,616 and in the commonly assigned U.S. Pat. No. 3,468,498 to L. J. Bunting, a motion picture projector is disclosed wherein a supply spindle is mounted on an arm for movement between a single lowered position and the single raised or elevated position. When the spindle is in its lowered position it is adapted to be received in the core of a relatively small capacity film reel (such as a reel for approximately 50 or 100 feet of film) located within a cartridge mounted on the projector. When the spindle is moved to its raised position it is adapted to be engaged with the core of an unenclosed film reel. In the beforementioned copending patent application entitled Interlock Mechanism or Cartridge Loading Motion Picture Projector or the Like, a mechanism is disclosed for adapting such a projector for receiving larger size cartridges containing film reels of larger film capacities, such as reels having capacities of approximately 200 and 400 feet of film. The latter application discloses movement of the spindle along an arcuate path from a lowered position to each of two additional (raised) positions wherein the spindle is engageable with reel cores within cartridges of various sizes without such movement disabling film feeding mechanisms of the projector that are adapted to enter the cartridge and remove the leading end of film from the cartridge. Cartridges for such a projector have similar locating structures, and normally corresponding locating structure of each cartridge is positioned at the same place with respect to the projector so that openings in the cartridges for receiving the spindle on the projector are located along an arc that has a first radius of curvature. Cartridges of this construction and their usual mounting on the projector are described in the beforementioned copending patent applications. However, if the spindle moves on an arcuate path that has a radius of curvature that differs from said first radius, then modified cartridge mounting means for the projector are required in order for the spindle to be aligned with a cartridge opening at each of its several positions.

SUMMARY OF THE INVENTION

Accordingly, it is an object of this invention to provide modified cartridge mounting means for a cartridge loading motion picture projector or the like.

2

Another object of the invention is to provide cartridge mounting means for a cartridge loading motion picture projector or the like wherein cartridges intended to be mounted at the same place on the projector can be mounted at different positions so that an entire family of cartridge sizes can be accommodated on a cartridge loading motion picture projector having a spindle movable on a radius other than the usual radius required for accommodating such family of cartridges.

A further object of the invention is to provide improved means for securing a cartridge onto a cartridge loading motion picture projector.

According to the present invention a cartridge projector has a spindle that is supported for movement to each of a plurality of positions along an arcuate path having a radius of curvature that differs from the radius of curvature of openings in a family of cartridges of the type referred to herein. Cartridge mounting means on the projector is engageable by locating structure on each size of cartridges for positioning such cartridges on the projector so that their openings are at positions along the arcuate path through which the spindle moves.

The invention, and its objects and advantages, will become more apparent in the detailed description of the preferred embodiments presented below.

BRIEF DESCRIPTION OF THE DRAWING

In the detailed description of the preferred embodiments of the invention presented below, reference is made to the accompanying drawing, in which:

FIG. 3 is an enlarged perspective view of the portion of the projector illustrated in FIG. 2 and showing a cartridge adjacent to the mounting surface of the projector; and FIG. 4 is a view, partially broken away and taken from the right side of FIG. 3 illustrating one manner of bringing a cartridge into its mounted position on the projector.

DESCRIPTION OF THE PREFERRED EMBODIMENT

Because photographic apparatus are well known, the present description will be directed in particular to elements forming part of, or cooperating more directly with, the present invention, apparatus not specifically shown or described herein being understood to be selectable from those known in the art.

Figure 1:
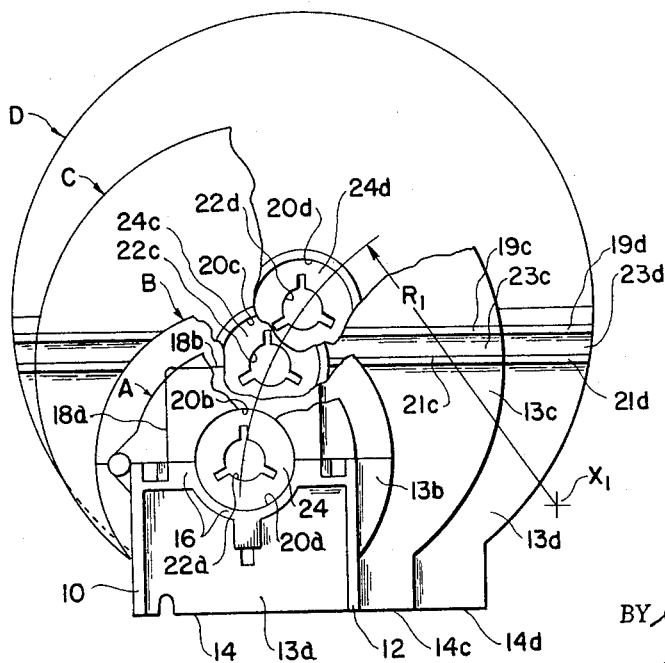
FIG. 1 is a view showing portions of a plurality of cartridge sizes adapted to receive reels of various film capacities, the cartridges having similar locating structures and being superimposed with such structures in alignment.

FIG. 1 of the drawings illustrates four sizes of cartridges generally designated A, B, C and D that may be referred to as a family of cartridges. Each of the cartridges A through D is a different size and is adapted to receive reels containing motion picture film or the like with the film capacities of the reels being approximately 50, 100, 200 and 400 feet of film, respectively, depending, inter alia, on the thickness of the film. Cartridges of the type shown in the drawings are disclosed in the beforementioned patent applications Ser. Nos. 731,561, 731,562 and 736,524. In order to avoid repetition of the disclosure in such applications, those disclosures are incorporated herein by this reference. The A size cartridge has two spaced and generally parallel ribs 10 and 12 that extend upwardly along one face 13 of the cartridge from the lower edge 14 of the cartridge. These ribs are joined along their upper edges by other rib-like structure 16. A generally rectangular projection 18 on the upper portion of the cartridge and one or more surfaces or edges of the structures 10, 12, 16 and 18 may be used for accurately locating the cartridge on a surface of a projector plate in the manner disclosed in the beforementioned applications. The A size cartridge also has a centrally located opening 20 through a wall of the cartridge. A spindle on a projector is adapted to project through opening 20 for reception by an opening 22 in the core 24 of a reel positioned within the cartridge for supporting the reel for rotation within the cartridge.

Each of the cartridges designated B, C and D also have cartridge locating ribs thereon corresponding to the ribs 10 and 12 and, in subsequent description this locating structure (and other portions) of the various cartridge sizes will be differentiated (where necessary) by use of subscripts $a$, $b$, $c$ and $d$ for the respective cartridge size. While these ribs are symmetrically located on the A and B size cartridges, they are offset on the C and D size cartridges so that when all four cartridge sizes are superimposed as shown in FIG. 1 with the rib structures in alignment, then the lower left edge of the cartridges are superimposed directly over one another and the C and D cartridges are offset to the right. Cartridges C and D each have a pair of spaced, parallel ribs 19, 21 defining a recess 23 that is substantially perpendicular to the length of ribs 10 and 12. The upper edge of rib 21 on the C and D size cartridge (i.e., the lower edge of the recess) and the upper edge of projection 18 on the A and B size cartridge are the same distance from the lower edge 14 of the respective cartridge, and these edges are adapted to cooperate with a bar on the projector (as described in U.S. application Ser. No. 731,562) for mounting the cartridge on the projector.

The B size cartridge has its opening for the spindle in alignment with the opening 20 on the A size cartridge then the ribs are superimposed so that the A and B size cartridges can be located by the same mounting means on the projector, and both cartridges can receive the spindle without adjusting the position of the spindle. The C size cartridge and the D size cartridge, on the other hand, have openings 20c and 20d, respectively, that are offset upwardly to the right from the corresponding opening in cartridge sizes A and B when the cartridges are superimposed in the manner shown in FIG. 1. The axes of the spindle openings are located along a radius designated R1 so that ordinarily the spindle for the projector would be mounted for pivotal movement along an arcuate path having a center of curvature located at X1, thereby permitting the use of single cartridge mounting structure on the projector in the manner described in the beforementioned copending applications. Ideally, existing projectors could be modified to locate the spindle for movement along such an arcuate path; however, in practice such may not be feasible or practical due to the presence of other projector structures that might interfere with movement of the spindle about axis X1, or due to space requirements or limitations. Accordingly, if the projector spindle is to be mounted for movement along a path having a radius other than radius R1 or about some axis other than axis X1, and if the previously described locating structures on the cartridges are to be used for locating the cartridges on the projector, then cartridge mounting structures should be provided on the projector for locating the A and B size cartridge at one location, for locating the C size cartridge at a second location, and for locating the D size cartridge at a third location. The mounting structures of the invention achieve this desirable result.

Figure 2:
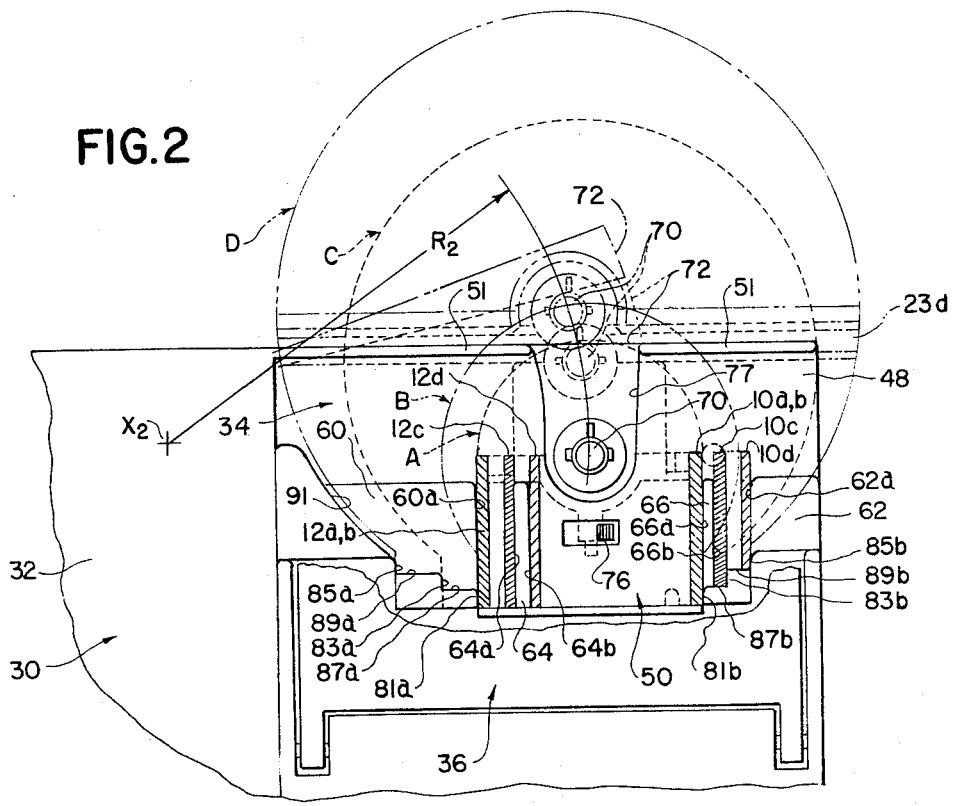
FIG. 2 is a fragmentary view of a portion of a motion picture projector or the like of this invention illustrating means for mounting each of the cartridges of FIG. 1 on the projector in a position so that the projector spindle can be moved along an arcuate path and be properly received within the core of a reel within each of the cartridges.

Referring now to FIGS. 2–4 of the drawings, a portion of the projector of this invention is shown generally at 30 and comprises a projector plate 32 having in its outer face a recess defining a socket generally designated 34. The lower portion of the socket can be closed by a door 36 that is hinged at 38 for movement between a closed position (FIG. 2) and an open position (FIGS. 3 and 4). The door 36 can be held in the closed position by cooperating latch means 40 and 42 on the door and on the projector plate, respectively. Suitable resilient means, such as a foam material shown at 44, can be provided on the inner surface of door 36 for resiliently engaging cartridges mounted on the projector for urging the cartridges against plate 32, thereby to hold the cartridges on the projector.

Socket 34 includes a rear wall 48 against which the cartridge faces 13 shown in FIG. 1 are adapted to be positioned when they are properly located on the projector. Perpendicular to the wall 48 is a shoulder 50 which is engageable by the lower edge 14 of each cartridge. A bar 51 projecting into the socket above shoulder 50 is positioned so that it is receivable in recess 23 of the C and D size cartridges and is just above projections 18 and ribs 21. Shoulder 50 and bar 51 cooperate with the bottom edge of the cartridges and with the members 18 and 21 for establishing the position of each cartridge in a vertical direction (as viewed in the drawings). An elongate slot 52 in shoulder 50 allows movement of a drive belt 54 of a film feeding mechanism upwardly into an opening in the bottom of each of the cartridges during feeding of film from the cartridges in a manner described more fully in the beforementioned U.S. application Ser. No. 685,616. The film feeding mechanism also includes a film stripping finger 56 that is movable through a slot 58 adjacent the shoulder 50 and through an opening in the cartridges for deflecting the leading end of the film from the film roll in the cartridge as described in that application.

Projecting outwardly from wall 48 in socket 34 is a pair of cartridge mounting members 60 and 62 comprising abutments that have substantially parallel and spaced side edges 60a and 62a that face each other and are used for locating various sizes of cartridges when engaged by ribs 10 or 12 in a manner explained more fully hereinafter. Edges 60a and 62a are spaced apart by a distance that exceeds the spacing between the outermost edges of ribs 10 and 12 on any of the cartridges. Projecting from wall 48 between edges 60a and 62a are two rails or abutments 64 and 66. Abutment 64 has two spaced elongate side edges 64a and 64b that are substantially parallel to each other and to edges 60a and 62a. Similarly, the rib or abutment 66 has two spaced and generally parallel side edges 66a and 66b that are substantially parallel to each other and to each of the edges 60a, 62a, 64a and 64b. Edges 64a and 66b are spaced from each other by a distance that is substantially equal to but slightly less than the spacing between the inner surfaces or edges of locating ribs 10 and 12 on each of the cartridges so that one of the cartridge sizes can straddle the abutments 64 and 66. Similarly, the pair of edges 60a and 66a, and the pair of edges 64b and 62a are spaced apart by distances that are equal to each other and substantially equal to (but slightly greater than) the spacing between the outer edges of ribs 10 and 12. These pairs of abutment edges are used for mounting the cartridges on the projector as explained later.

The length of each of the abutments 60, 62, 64 and 66 is less than the distance between the bottom edge 14 of the cartridge and the lower edge of the ribs 16 on any cartridge adjacent to the upper edge of the ribs 10 and 12. This permits each of the cartridges to be placed against the plate 32 with the ribs 10 and 12 abutting wall 48, with the lower edge 14 of the cartridge on the shoulder 50, and with the cartridges being held in this position by portions the door engaging the face of the cartridge that is opposite from locating members 10 and 12 on the cartridge.

A spindle 70 of the projector is mounted on one end portion of an arm 72, and the other end portion of the arm is mounted for pivotal movement about an axis designated X2 in FIG. 2. This mounting of the spindle permits its movement between each of several positions along an arcuate path having a radius R2 that is larger than the radius R1 (FIG. 1). (The arm should be mounted for movement along a path having a radius R1 if each of the cartridges is to be positioned on the projector by common mounting structures on the projector in the manner described in the beforementioned copending patent applications). When arm 72 and spindle 70 are in their lowered position as shown in FIG. 2, the spindle 70 is positioned for reception within the core opening 22 of reels within either the A or B size cartridges. The spindle can be released from this lowered position by means of a latch release member 76 in wall 48 and moved to an intermediate position (shown in solid lines in FIGS. 3 and 4) wherein the spindle is positioned for reception into a reel core in the C size cartridge, or to a further raised position (shown in dotted lines in FIG. 2) wherein the spindle 70 is adapted to be received in a reel core opening of a reel within the larger or D size cartridge. The spindle projects into the socket 34 through a slot or opening 77 when the spindle is in its lowermost position or when it is in its intermediate position for engagement with a reel in the C size cartridge.

In order to mount the cartridges on the projector so that the spindle openings in the cartridges are properly aligned for reception of the spindle 70 by the reel within the cartridge, the A and B size cartridges are positioned on the projector so that the outside edge of rib 12 of each of these sizes of cartridges is in engagement with the edge 60a of abutment 60 while the outside edge of rib 10 of these cartridge sizes is in engagement with the edge 66a of rib 66. When the C size cartridge is mounted on the projector the ribs 10c and 12c straddle the abutments 64 and 66 so that the inner surfaces of ribs 10c and 12c engage the outer surfaces 66b and 64a, respectively, of these abutments. When the D size cartridge is mounted on the projector the ribs 10d and 12d are positioned so that the outside edge of rib 12d is in engagement with edge 64b of abutment 64 and the outside edge of rib 10b is in engagement with the edge 62a of abutment 62. In each instance, the lower edge 14 of the cartridge engages the shoulder or shelf 50 so that the spindle opening of the cartridge is located at the desired elevation above that shoulder. By locating the cartridges in the manner described, the spindle can be moved along an arcuate path about the axes X2 to each of the three positions illustrated in FIG. 2 and it will then be aligned for reception into the reels in one or more of the cartridges A, B, C and D. In other words, by mounting and locating the cartridges in the manner disclosed the openings for the spindle in the various sizes of cartridges are located along a radius that corresponds to radius R2 rather than to the radius R1.

The cartridge can be placed on the spindle in any of several ways, including positioning of the cartridge in front of the wall 48 and then moving the cartridge in a direction parallel to the axis of the spindle 70. Also, if the spindle is retractable (as disclosed in the beforementioned copending application Ser. No. 736,524) then the cartridge can be mounted on the projector by movement of the cartridge downwardly along wall 48 until lower edge 14 of the cartridge engages the shoulder 50. If desired, the cartridge can be moved into place in the manner illustrated in FIG. 4 wherein the cartridge is first placed in a position generally perpendicular to wall 48 (as shown at the bottom left in FIG. 4), and then swung upwardly about the bottom of the cartridge to bring the reel core in the cartridge into alignment with and into engagement with the spindle 70. This type of mounting is desirable for larger size cartridges when or if the finger 56 of the film stripping mechanism projects into the socket 34 as shown in FIG. 3 since the finger may interfere with movement of the lower left edge of the cartridge into the socket by movement of the cartridge in a direction parallel to the axis of the spindle 70.

The projector preferably includes means for guiding each size of cartridge toward its corresponding mounting structure in socket 34. This guiding means is illustrated in the drawings as a stepped formation at the lower front of the socket comprising spaced, vertically extending pairs of shoulders 81a, 81b; 83a, 83b; and 85a and 85b, and horizontally extending pairs of shoulders 87a, 87b; and 89a, 89b. Shoulders 81a and 81b jointly define a relatively narrow space that is substantially the same width as the lower portion of both the A and B sizes of cartridges, and these shoulders are positioned so that the lower end portion of the cartridge can be inserted between the shoulders and thereby be guided into engagement with mounting edges 60a and 66a. Similarly, shoulders 83a and 83b define a somewhat wider space that is substantially equal to the width of the lower portion of the C size cartridge, and these shoulders are positioned so that the lower portion of the C size cartridge can be inserted therebetween and positioned on the shoulders 87a and 87b with the cartridge aligned in a generally horizontal position (as shown at the lower left of FIG. 4) thereby to align the ribs 10 and 12 on the C size cartridge with the mounting edges 64a and 66b on the projector. Similarly, the D size cartridge can be guided into position on the projector by using shoulders 85a, 85b that are substantially the same width as the lower portion of the D size cartridge, and by placing its lower portion on shoulders 89a and 89b, and then swinging it up about its lower edge into position on the projector, thereby to bring ribs 10d and 12d into engagement with the cooperating mounting structure on the projector. A curved shoulder 91 projects upwardly and to the left from shoulder 85a and conforms generally to the curvature of the curved portion of the D size cartridge. Shoulder 91 can be used for orienting the D size cartridge on the projector when it is moved into its mounted position while it is held parallel to the socket.

The particular mounting means shown is for a radius R2 that is larger than radius R1, and it will be understood that the positioning of the various abutments or edges defining the cartridge mounting means that cooperate with ribs 10 and 12 may be varied in width or positioning so that spindles movable about other radii are readily adaptable for reception into the cartridges of each size. Also, other arrangements of the cartridge mounting means can be used if radius R2 is smaller than radius R1. The versatility of the cartridge mounting means of this invention is desirable for many types of projectors including those non-cartridge loading projectors that are being modified for receiving cartridges and wherein the spindle on such projectors is already mounted for movement about an axis that is spaced from the spindle by a distance that is not equal to R1. Also, each size of cartridge is held onto the projector solely by means of the door 36 rather than by means of latching structures such as disclosed in the beforementioned U.S. patent applications.

The invention has been described in detail with particular reference to preferred embodiments thereof, but it will be understood that variations and modifications can be effected within the spirit and scope of the invention.

I claim:

1. In a cartridge-loading motion picture projector for receiving and locating each of a plurality of sizes of cartridges that are adapted to contain film wound on reels of different film capacities, each of the cartridge sizes having similar locating structure thereon adapted to engage cartridge mounting means on a projector; and each of the cartridges having an opening therein for receiving a spindle on the projector so that the spindle can engage a reel within the cartridge for rotatably supporting the reel therein, said openings and said locating structures on each of said cartridges being positioned with respect to each other and with respect to the corresponding openings and structures on other sizes of the cartridges so that the openings are located along an arc having a first radius of curvature when the locating structures are successively engaged with the same mounting means on a projector so that the locating structures occupy the same relative position on the projector, the improvement comprising:
   a spindle for engaging a film reel within a cartridge;
   means supporting said spindle for movement to each of a plurality of positions along an arcuate path having a second radius of curvature that differs from the first radius of curvature; and
   cartridge mounting means located on the projector relative to the spindle so that such mounting means is engageable by said locating structures on each size of said cartridges for positioning said cartridges on the projector so that the openings in the various cartridge sizes are located at positions along the arcuate path through which the spindle moves that correspond to the positions of the spindle along such path, thereby to permit the spindle to engage a reel within any of said sizes of cartridges by adjusting the spindle between each of its positions along its path of movement.

2. In a projector as set forth in claim 1 wherein said cartridge mounting means comprises a plurality of spaced surfaces, said surfaces being arranged in pairs with each pair being spaced apart by distances corresponding to the spacing of portions of said locating structures of at least one size of cartridge so that the cartridge locating structure of one cartridge size is engageable with one pair of surfaces of the mounting means and the cartridge locating structure of another cartridge size is engageable with another pair of surfaces of the mounting means.

3. In a projector as set forth in claim 1 wherein said locating structure on each cartridge comprises a pair of spaced and generally parallel ribs, and said mounting means on said projector comprises a plurality of abutments defining three pair of spaced and generally parallel side edges with each pair of said edges being engageable by edge portions of said ribs on said cartridges for positioning of said cartridges on the projector.

4. In a projector as set forth in claim 3 further comprising means on the projector adjacent said mounting means for guiding each size cartridge into a position on the projector wherein the ribs on the cartridge are engageable with a pair of said side edges on the projector.

5. In a projector as set forth in claim 1 further comprising means on the projector adjacent said mounting means for guiding each size of cartridge into engagement with part of said mounting means, said guiding means comprising a stepped formation defining a plurality of spaces of successively greater widths each of which substantially corresponds to one dimension of a cartridge.

6. In a projector as set forth in claim 1 wherein said cartridge mounting means comprises abutments defining six spaced and generally parallel surfaces engageable by the cartridge locating structures with said surfaces being arranged in pairs, two of said pairs of said surfaces being spaced apart by distances that correspond to the external dimensions of said locating structures on said cartridges and one of said pair of surfaces being spaced apart by a distance that corresponds to the spacing between the internal dimensions of said locating structures on said cartridges.

7. In a projector as set forth in claim 6 further comprising guiding means on said projector adjacent said surfaces for guiding a cartridge into engagement with each pair of said surfaces, said guiding means comprising means defining a plurality of spaces corresponding generally to the width of a portion of one size of cartridge.

8. In a projector as set forth in claim 1 further comprising means on the projector defining a socket, said mounting means being positioned in said socket, and a door mounted on the projector for movement between (1) an open position wherein a cartridge is insertable into the socket and (2) a closed position wherein the door is engageable with a cartridge for holding it in its mounted position.

* * * * *